(12) United States Patent
Shek et al.

(10) Patent No.: US 6,185,652 B1
(45) Date of Patent: Feb. 6, 2001

(54) INTERRUPT MECHANISM ON NORTHBAY (75) Inventors: Edde Tang Tin Shek, Louisville; Robert E. Stubbs, Longmont, both of CO (US)

(73) Assignee: International Business Machin es Corporation, Armonk, NY (US)

( * ) Notice: Under 35 U.S.C. 154(b), the term of this patent shall be extended for 0 days.

(21) Appl. No.: 09/186,043

(22) Filed: Nov. 3, 1998

(51) Int. Cl.$^7$ .............................. G06F 13/14; G06F 9/48
(52) U.S. Cl. ............................................ 710/263; 710/266
(58) Field of Search .................................. 710/262, 260, 710/263, 264, 266, 48; 709/100, 107, 102

(56) References Cited

U.S. PATENT DOCUMENTS

| | | |
|---|---|---|
| 5,805,883 * | 9/1998 | Saitoh . |
| 5,892,957 * | 4/1999 | Normoyle et al. . |
| 5,928,348 * | 7/1999 | Mukai et al. . |
| 5,974,440 * | 10/1999 | Brooks et al. . |

* cited by examiner

*Primary Examiner*—Gopal C. Ray
(74) *Attorney, Agent, or Firm*—Flehr Hohbach Test Albritton & Herbert LLP (57) ABSTRACT

An interrupt tracking mechanism includes a CPU that handles interrupts generated by an interrupt generator, a storage element accessible to the CPU, an interrupt counter implemented in hardware and a single set of interrupt status-registers. The interrupts are generated by the interrupt generator in an order determined by the order of tasks sent by the CPU to the interrupt generator and indicate completion of those tasks. The CPU can maintain in the storage element an ordered list of at least a contiguous subset of the tasks sent to the interrupt generator. The CPU can also maintain in the storage element a count of tasks sent to the interrupt generator as part of the contiguous subset. For each interrupt it generates the interrupt generator increments the count in the interrupt counter and writes the address of the interrupt to the interrupt status register. Because a single interrupt status register is used, only the status information for the latest interrupt is available in the register. When it has time to respond to an interrupt the CPU reads then resets the interrupt counter and reads the interrupt status register to determine the current interrupt count and interrupt address. From the current interrupt count and address and the contents of the ordered list and the task count the CPU is able to determine with certainty how many tasks previously sent to the interrupt generator are pending and accordingly generate new tasks to keep the interrupt generator busy.

7 Claims, 6 Drawing Sheets

Memory 110

| | |
|---|---|
| Operating System | 130 |
| Programs: | 140 |
|    Control Program | 142 |
|    Script Composer | 146 |
| Data: | 150 |
|    Interrupt Count | 152 |
|    Interrupt Address | 154 |
|    Address Table (AT) | 156 |
|    Last Script Header | 158 |
|    Interrupt Mask | 160 |
|    Host Queue | 162 |

FIG. 4A

SDRAM 124

| | |
|---|---|
| Scripts | 170 |
|   Script 1 | 170-1 |
|     SrcPtr1 | 172-1 |
|     SrcPtr2 | 172-2 |
|     SrcPtr3 | 172-3 |
|     SrcPtr4 | 172-4 |
|     SrcPtr5 | 172-5 |
|     SrcPtr6 | 172-6 |
|     SrcPtr7 | 172-7 |
|     SrcPtr8 | 172-8 |
|     DestPtr | 174 |
|     Ctrl/Count | 176 |
|     LinkListPtr | 178 |
|   Script 2 | 170-2 |
|   Script 3 | 170-3 |
|   Script n | 170-n |
| Queue | 180 |
|   Script j Ptr | 182-1 |
|   Script j+1 Ptr | 182-2 |
|   Script j+2 Ptr | 182-3 |
| Source Records | 184 |
| Parity Words | 186 |

INTERRUPT MECHANISM ON NORTHBAY

The present invention relates generally to interrupt mechanisms and, particularly, to high-performance interrupt mechanisms that do not require the use of realtime-interrupt technology.

BACKGROUND OF THE INVENTION
Conventional Interrupt Systems

Computing systems that were designed and built during the 50's and early 60's used a "polling" scheme to track internal and external system events. The polling scheme is simple and effective, but it has two major drawbacks. First, it consumes too much processing power for event polling, thereby slowing the system's performance. Second, the ability to detect an event is highly dependent on the frequency of polling for that particular event. If the polling frequency is high, valuable processing power is wasted on the polling and less power is left for other tasks. If the polling frequency is too low when compared to the frequency of an event that the processor is trying to detect, then the processor may miss some incidents of the event.

Interrupt mechanisms were invented to improve system performance and have been widely used in the past three decades. There are two different types of interrupt architecture: "realtime interrupt architecture" and "non-realtime interrupt architecture". Each architecture can be evaluated in terms of the classic measures of interrupt-response time and interrupt latency, each of which affects system throughput and overhaul system performance.

Generally, a "realtime interrupt architecture" implementation (referred to hereafter as a "realtime system") offers better system performance than a "non-realtime interrupt architecture" implementation (non-realtime system) but is also more costly to build. A realtime system is typically more expensive than its non-realtime cousin because the realtime system requires a faster processor. A realtime system is also more complex because it requires a "realtime-operating-system" to fully realize the advantages of its realtime interrupt architecture. Despite its higher cost, the realtime architecture provides a level of performance that is far superior to that of its non-realtime counterpart.

A realtime system is defined in terms of its response time in detecting and servicing an interrupting event. In general, a realtime system must be capable of detecting and servicing the event well within a pre-defined amount of time. Its reaction to an event must be quick enough that no events will be missed, which generally implies a requirement for a fast processor.

There is no clear definition of a "non-realtime" system. Generally speaking, any slow system that imposes large interrupt latency or is slow to react to the interrupt events is characterized as a non-realtime system. Typically, such systems are less complicated than realtime system and, as a result, are less expensive to build.

Each type of architecture is further separated into a "blocking interrupt architecture" sub-type and a "non-blocking interrupt architecture" sub-type. In general, a blocking interrupt architecture can be implemented in the command-issuing-processor (typically referred to as the master) or in the command-receiving-processor (typically referred to as the slave). The blocking mechanism blocks the subsequent operation of the interrupting device pending handling of the interrupt event. This scheme simplifies the handshaking protocol between the interrupt-producer and the interrupt-server. For example, in a blocking-interrupt architecture a processor sends several commands to another device, which can be a general-purpose-processor, or it can be a special-purpose-processor. The command-receiving-processor (the slave) executes the first command. When the operation is completed, it sends a signal to interrupt the command-issuing-processor (the master). Meanwhile, it still has commands waiting for execution. However, the subsequent executions are blocked by the pending interrupt. In other words, the blocking-mechanism prohibits other operation until the first pending-interrupt has been serviced and processed. Because the subsequent operations are blocked, the current state of the event and its associated information can be preserved until the interrupt-server has time to process it. Thus, simplified hardware and software implementation can easily satisfy the simple handshaking requirements.

On the other hand, a non-blocking-interrupt architecture allows the command receiving processor (the slave) to keep running without stalling. Thus, the non-blocking scheme provides a level of performance that is superior to its blocking cousin. However, serious drawbacks are inherent with the non-blocking architecture. Since the interrupt is not blocked, the interrupt-server needs to be much faster than the interrupt-producer. Otherwise, if the interrupt generation speed is higher than the interrupt serving speed, some interrupts will be lost.

Even if the interrupt-server is fast enough to process all interrupt events, it must provide temporary storage large enough to buffer the information (e.g., interrupt state) associated with each interrupt. The more pending interrupts that are allowed, the bigger the size of the required temporary storage.

To reduce the implementation cost of a non-blocking implementation, temporary storage elements can be implemented as part of the main-memory, but this will slow system performance. Temporary storage can also be implemented with fast hardware registers, but this implementation is quite expensive. Furthermore, since interrupts are not blocked in a non-blocking implementation, several interrupts that occur at the same time will be difficult to prioritize and serve in a timely manner. This imposes serious limitations on the non-blocking architecture, and greatly reduces the usefulness of the non-blocking interrupt scheme.

To solve the above-mentioned problems of the non-blocking architecture, a software interrupt-counter (or interrupt queue) can be used to keep track of the interrupt events. However, even if a software counter is used the CPU (interrupt-server) still must respond to the interrupt quickly enough to avoid missing any events. The benefit of using a non-blocking architecture is greatly reduced in such an implementation because some of the processor's power is wasted on the task of updating the software-counter.

Another solution to problems of the non-blocking architecture is to use devices that can stack two or three interrupts, with each interrupt having a set of associated status registers, so that the information that belongs to each interrupt is preserved until the interrupt is serviced. This is an expensive approach. The number of required status-register sets grows rapidly if a large mount of stacking interrupts are allowed. Thus, this approach is only practical for a small tack as it is very expensive to implement a large number of hardware register sets.

Present Problem: Insufficiency of Conventional Interrupt Architectures for High Speed Processors Executing Small Tasks A goal of the present invention is to provide interrupt services for an ASIC called NorthBay™ (NorthBay is a trademark of Mylex, Corp), which provides support services for a RAID controller (RAID is an acronym for "Redundant Array of Independent Disks"). A RAID controller coordinates reading and writing in a RAID system, which comprises multiple independent disks on which data is stored, typically redundantly. To ensure data fidelity the RAID controller generates a parity value for each data record written to the RAID system; the parity value is subsequently stored in the RAID system. The parity record is used whenever the RAID controller has determined that one of the disk arrays has been corrupted, then the parity is used to regenerate the original data record.

Among other things, the NorthBay ASIC implements a fast special-purpose-processor that computes the parity values used in the RAID system. The data for which the NorthBay ASIC is to compute parity is specified by the RAID controller's CPU in response to host disk transactions. It is anticipated that the NorthBay ASIC will be much faster than any low-to-medium cost CPU that could be used in the RAID controller. These host disk transactions can comprise multiple, near-simultaneous requests to read and/ or write small data records to the RAID system. For example, the transactions might be requests to review the credit limits of buyers in credit card transactions involving a particular financial institution.

In a RAID controller implementing a conventional interrupt architecture the CPU would individually specify the data records for which the NorthBay ASIC is to compute parity in response to interrupts from the ASIC. That is, to receive a new data record on which to work the ASIC would need to interrupt the CPU and then wait for the CPU to return the address of the record. Given the power of the NorthBay ASIC and the smallness of its tasks (i.e., computing parity for a small record), none of the conventional interrupt architectures, if implemented in the CPU, would be able to keep the NorthBay ASIC fully occupied without unduly taxing the resources of the CPU.

Therefore, it would be desirable to develop new interrupt event handling strategies that are likely to keep the NorthBay processor, or other processors executing similar tasks, busy. These new strategies should avoid the above-recited problems of the prior art, which include:
- the expense and complexity of realtime interrupt implementations;
- the low throughput of non-realtime interrupt implementations;
- the low throughput of interrupt-blocking implementations; and
- for non-interrupt-blocking implementations;
  - the risk of missing interrupt events;
  - the impact on processor power of maintaining an interrupt counter in the CPU;
  - the cost of hardware registers used to store interrupt state;
  - the cost of hardware registers used to implement an interrupt stack.

SUMMARY OF THE INVENTION

The present invention is a unique interrupt tracking mechanism that avoids the above-recited problems of the prior art. Embodiments of the inventive mechanism provide enhanced overall system performance (i.e., throughput) as compared to conventional interrupt architectures but require neither a fast processor to handle interrupts nor a realtime-operating-system. In fact, embodiments of the present invention provide improved system throughput even though, in some situations, the individual interrupt responsiveness and latency are worsened as compared to a conventional realtime interrupt system. The present invention is thus most useful in those applications (such as the NorthBay XOR engine, described below) where overall system throughput is a far more important factor than individual interrupt response time. This class of applications only excludes those real-time applications wherein an interrupt request must be handled with minimal latency.

In particular, an interrupt tracking mechanism implemented in accordance with the present invention includes a CPU that handles interrupts generated by an interrupt generator, a storage element accessible to the CPU, an interrupt counter implemented in hardware and a single set of interrupt status-registers. The interrupt counter and the set of interrupt status-registers are accessible to the interrupt generator. The interrupts are generated by the interrupt generator in an order determined by the order of tasks sent by the CPU to the interrupt generator and indicate completion of those tasks. The CPU can maintain in the storage element an ordered list of at least a contiguous subset of the tasks sent to the interrupt generator. The CPU can also maintain in the storage element a count of tasks sent to the interrupt generator as part of the contiguous subset.

The interrupt generator can generate interrupts at a rate that is far higher than can be handled by the CPU. For each interrupt it generates the interrupt generator increments the count in the interrupt counter and writes the address of the interrupt to the interrupt status register. Because a single interrupt status register is used, only the status information for the latest interrupt is available in the register. When it has time to respond to an interrupt the CPU reads then resets the interrupt counter and reads the interrupt status register to determine the current interrupt count and interrupt address. From the current interrupt count and address and the contents of the ordered list and the task count the CPU is able to determine with certainty how many tasks previously sent to the interrupt generator are completed.

The CPU can make this determination according to at least one of two methods. According to a first method the CPU retrieves from the ordered list a task address whose location corresponds to a known function of the current and task counts and verifies that the retrieved task address and the current interrupt address are identical. In another embodiment the CPU searches in the ordered list for the current interrupt address and verifies the current interrupt count by comparing it to a known function of the task count and the index in the ordered list of the current address.

In yet another embodiment wherein the interrupt generator provides only one of the interrupt counter or the address register, the CPU determines from the current count and the task count, or the current register and the stored list, respectively, what previously queued tasks have been executed by the interrupt generator.

After determining what tasks have been executed, the CPU assigns new tasks to the interrupt generator to keep the interrupt generator fully occupied. These new tasks are typically related to transactions issued by a host whose data storage needs are at least partially provided by the RAID system.

In a worst case scenario when the CPU reads the count and address register(s) the interrupt generator must stall if it is about to issue another interrupt to the CPU. The stall time is minimized when the CPU performs back-to-back reads of the interrupt counter and the interrupt status register in as short a time as possible. Thus, the present invention enables the interrupt generator to execute nearly continuously; i.e., with high data throughput.

In one embodiment the CPU is provided in a RAID controller and the interrupt generator is a coprocessor (called "NorthBay") that computes parity for RAID write operations dispatched by the RAID controller. The NorthBay includes a built-in interrupt-counter that keeps track of the number of interrupt events. This use of a hardware counter in the NorthBay offloads the CPU so that more processing power is available for other tasks, thus increasing the CPU efficiency. The interrupt counter reports how many interrupts have been generated since the last time the CPU processed an interrupt. The NorthBay also includes another register, called the "Dip-Stick-Address register," that tracks the address of whichever task is currently executing.

In this embodiment, when the CPU is not busy it may ask the NorthBay for up-to-date interrupt information from the interrupt counter and the "Dip-Stick-Address register." When the CPU reads the interrupt counter all NorthBay status reporting (i.e., processing involving writes to these registers) is locked until the CPU reads the "Dip-Stick-Address register", after which the lock is released. A back-to-back read-operation issued by the CPU to these two registers ensures that, for the worst case, this status preservation lock stalls the NorthBay only for a few clocks. The stall condition only occurs if the engine is just about ready to issue a new interrupt just before or as the CPU reads the registers. Typically, this situation only occurs 1% of the time and therefore will not significantly affect the performance of the NorthBay.

Embodiments of the present invention avoid at least the following three problems that would result from application of the conventional interrupt handing mechanisms in systems where a CPU needs to handle high rate interrupts for a high speed coprocessor: 1) the coprocessor needing to stall between interrupts; or 2) the CPU needing to implement some kind of interrupt tracking mechanisms, which would slow the CPU; or 3) the CPU needing to handle the interrupts in realtime, which would affect the overall CPU performance.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
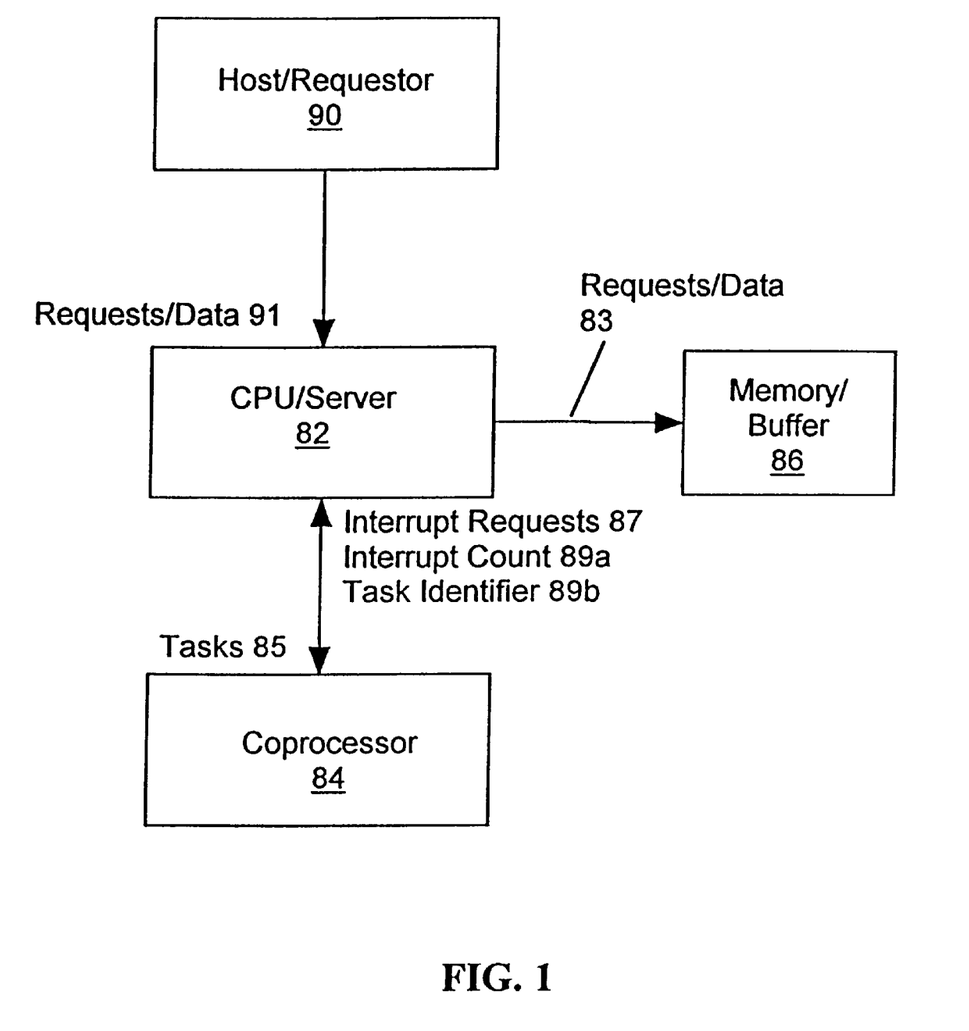
FIG. 1 is a block diagram of a computer system in which the present invention can be implemented.

FIG. 1 is a block diagram of a generic computer system in which the present invention can be implemented. The generic computer system includes a host/requestor 90, a CPU/server 82, a memory/buffer 86 and a coprocessor 84. The host/requestor 90 and the CPU/server 82 can be implemented as two boards within a single enclosure, as two computers coupled to a local area network, wide area network or the Internet, or as an equivalent configuration. The memory/buffer 86 can be any combination of a fast semiconductor memory (e.g., random access memory, or RAM) or a slower optical or magnetic memory (e.g., hard disk drive). The coprocessor 84 exists in a master/slave relationship to the CPU/server 82 wherein it performs tasks 85 issued by the CPU/server 82. Upon completion of each task, the coprocessor 84 returns an interrupt request 87, which the CPU is free to ignore, or mask out. Typically, the coprocessor 84 is a special purpose processor that is optimized to perform a limited number of operations on small records from the memory/buffer 86 as designated by the CPU 82.

For example, in the RAID system, the coprocessor 84 could be a powerful engine for computing parity of records stored in the memory (i.e., disk array), the addresses of which are provided by the CPU. In the telecommunications system, the coprocessor 84 could be a modem that demodulates information previously buffered by the CPU 82. In a manufacturing control system used in a bottling plant that supervises multiple bottling operations, including bottle cleaning, filling, capping and inspection, the coprocessor 84 could be a microcontroller for one or all of the bottling stations that initiates a respective operation on a batch of bottles upon direction of the CPU 82. These examples are merely exemplary of the class of applications in which the present invention could be implemented.

In each of these situations, a sufficiently powerful coprocessor 84 would be starved if it had to wait for the CPU to return a single task 85 in response to each interrupt request 87. Consequently, the CPU sends a group of tasks 85 in response to an interrupt 87 (or whenever the CPU has free time). For example, in the case of the RAID system, the tasks 85 could comprise a group of pointers to data records for which the coprocessor 84 is to compute parity and associated locations where the coprocessor 84 is to store the parity. In the case of the telecommunications system, the tasks 85 could comprise a group of addresses of records the coprocessor 84 is to demodulate. In the case of the bottling system, the tasks 85 could comprise a group of commands to the coprocessor 84 to fill bottles that were just previously cleaned.

Each time it completes a task, i.e., issues an interrupt request 87, the coprocessor 84 increments an internal interrupt counter that holds an interrupt count 89a. Alternatively, the co-processor 84 can issue an interrupt request 87 and increment the internal interrupt counter after completing a group of tasks (e.g., a script) sent by the CPU 82. When the CPU has time to service the co-processor it first reads the interrupt count 89a. The value of the interrupt count tells the CPU how many and which tasks 85 (or groups) previously sent have been processed by the coprocessor 84. The CPU 82 knows which tasks 85 have been processed as it alone determined the order of the tasks 85, which are processed in order by the coprocessor 84. Based on this information and new buffered requests/data 83 from the host/requestor 90, the CPU 82 is able to formulate a new list of tasks 85 to send to the coprocessor 84.

This system lacks the responsiveness to individual interrupts of a realtime system. For example, the CPU could ignore many interrupts 87 before finally servicing the coprocessor. However, even though it is far simpler to implement than a realtime system, with the present system and method overall throughput is very high as the CPU 82 is able to keep the coprocessor 84 continuously busy for long periods of time. In fact, the only time the coprocessor needs to stall is when the CPU 82 decides to read the interrupt counter just as a new interrupt request 87 is about to issue.

Because of its lack of responsiveness to individual interrupts, the present invention is not useful in situations where each interrupt must be handled with as low latency as possible. However, in a system where some lag between an interrupt and a subsequent interrupt response is permissible and where the tasks 85 can be ordered by the CPU 82, the present invention is advantageous. For example, it is immaterial to the overall operation of the bottling facility whether each interrupt indicating that another bottle has been cleaned is responded to by the CPU immediately issuing commands to fill the newly cleaned bottle and to clean yet another bottle. Rather, it is quite permissible for the CPU to ask a coprocessor 84 to clean one batch of bottles and then, when that batch has been cleaned, to ask another coprocessor 84 to fill that batch. The only delay in this system is the very short pause that occurs at the very beginning of a bottling operation when the filling station is waiting for the first set of clean bottles.

In other embodiments of the present invention, in addition to or instead of the interrupt count 89a, the coprocessor 84 can keep track of an identifier 89b of the just completed task in an interrupt address register. The CPU 82 can then read the task identifier 89b instead of or in addition to the interrupt count 89a to determine which tasks have been completed. The CPU is able to determine the completed tasks from this information if it retains an ordered list of the tasks previously sent. If the coprocessor 84 stores and the CPU 82 reads both the interrupt count 89a and the task identifier 89b, the CPU 82 can verify that the interrupt count and the associated task identifier are in synch and if, not, initiate an error determination procedure to accurately determine the state of the coprocessor. A specific embodiment of the present invention, for use in a RAID system, is now described in reference to FIG. 2.

Figure 2:
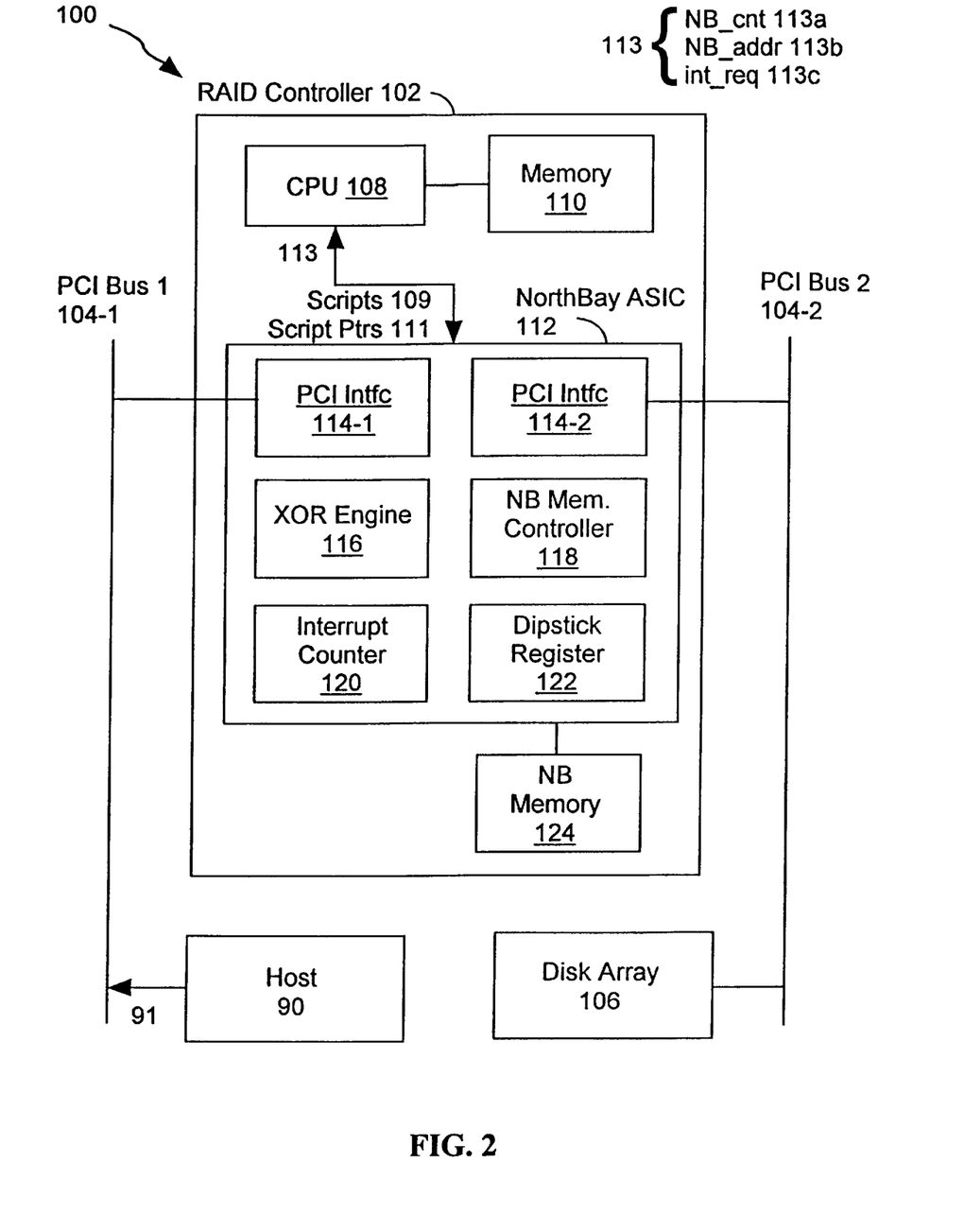
FIG. 2 is a block diagram of a RAID controller in which one embodiment of the present invention is implemented.

FIG. 2 is a block diagram of a RAID controller 102 that embodies the present invention. In this implementation the RAID controller 102 is coupled to the host 90 via one PCI bus 104-1 and to a disk array 106 that comprises the disk storage for a RAID system via a second PCI bus 104-2. This bus connection arrangement is merely exemplary and can be implemented using equivalent configurations. For example, the busses 104 can be EIDE, IDE, SCSI or other bus types and the disk array 106 and the host 90 can share both busses in any combination. Also there might only be one bus 104.

The host provides requests/data 91 as described in reference to FIG. 1. In particular, the host requests/data 91 comprise disk I/O commands to be implemented by the RAID controller 102. In response to the disk I/O commands 91 the RAID controller writes and reads data to/from the disk array 106. The RAID controller 102 includes a CPU 108, a memory 110, a coprocessor called the NorthBay ASIC (Application Specific Integrated Circuit) 112 and an NorthBay memory (NB-memory) 124, which could be a Synchronous Dynamic RAM (SDRAM) or equivalent (static or dynamic) semiconductor memory.

The CPU 108 is ultimately responsible for operations of the RAID controller 102, which it carries out with support from the NorthBay 112. The CPU 108 issues commands to the NorthBay 112 via scripts 109, each of which includes multiple tasks 85 (FIG. 1). Each task 85 directs the NorthBay 112 to generate parity for a particular data record in the NB-memory 124 and to store the parity in a particular location on the NB-memory 124. The CPU 108 moves data records between the disk array 106 and the NB-memory 124 depending on the host requests 91. That is, if the host request is for a disk write, the data to be written is first stored by the CPU in the NB-memory 124 to enable the NorthBay 112 to generate parity, both of which values are subsequently stored in the disk array 106. If the host request is for a read, the data to be read is copied from the disk array 106 to the NB-memory 124 by the CPU 108 and the NorthBay checks its correctness.

Information 113 flowing from the NorthBay 112 to the CPU 108 during execution includes interrupt requests 113c, a NorthBay count (NB_cnt) 113a and a NorthBay address (NB_addr) 113b. The NorthBay 112 issues an interrupt request 113c every time it completes one of the scripted tasks 85 or an entire script 109. The CPU 108 reads the NB_cnt 113a and NB_addr 113b whenever it has time to service the NorthBay 112. The NB_cnt value 113a indicates the number of interrupts issued by the NorthBay since the CPU last serviced the NorthBay. The NB_addr value I 13b gives the address of the task whose completion resulted in the NorthBay sending the most recent interrupt request 113c.

The NorthBay ASIC 112 includes four major functions: two PCI-bus interfaces 104-1, 104-2; an XOR-engine 116; and an N-B-memory controller 118. The NorthBay 112 also includes an interrupt counter register 120 and a dipstick register 122.

The completely independent PCI-bus interfaces 114-1, 114-2 communicate with other processors (e.g., the host 90 and the disk array 106) over the PCI busses 104-1, 104-2. Each PCI-bus 104 is capable of moving data at a rate of 265 Mbytes per second between an external bus (not shown) and the embedded memory subsystem 124. Each bus 104 has its own Read-FIFO and Write-FIFO (not shown), which are used to maximize the data throughputs and the bus efficiency.

The XOR engine 116 performs "RAID Parity" computations and "Block-Move" operations (moving a block of memory content to another memory block) and may also be used to check the integrity of the data that is stored in the RAID storage system 106. The XOR engine 116 operates as slave to the CPU's master. All operations of the XOR engine 116 are in response to the scripts 109 generated by the CPU 108. Each time it executes one of the tasks 85 specified in a script 109 or an entire script (this depends on its configuration) the XOR engine 116 issues an interrupt request 113c, writes into the dipstick register 122 the address of the task whose completion triggered the interrupt into the dipstick register 122 and increments the interrupt counter 120. Every time it is able to handle interrupt requests from the XOR engine 116 the CPU 108 reads the dipstick register 122 and reads and then resets the count in the interrupt counter 120. In one embodiment the two reads are performed by the CPU 108 back to back to minimize the need to stall the XOR engine 116 during the reads. As it computes parity the XOR engine 116 reads and writes data in the NB-memory 124 under control of the NB-memory controller 118.

Note that the NorthBay ASIC 112 is memory an exemplary embodiment of the present invention. More generally, the present invention encompasses all computer mechanisms for handling interrupts wherein the interrupt handler does not service interrupts from the interrupt requester individually, as in a realtime system, but instead issues groups of tasks (e.g., scripts) to keep the interrupt requester as close to fully occupied as possible. Other exemplary systems in which the present invention can be implemented include the bottling and telecommunications systems mentioned above.

Figure 3:
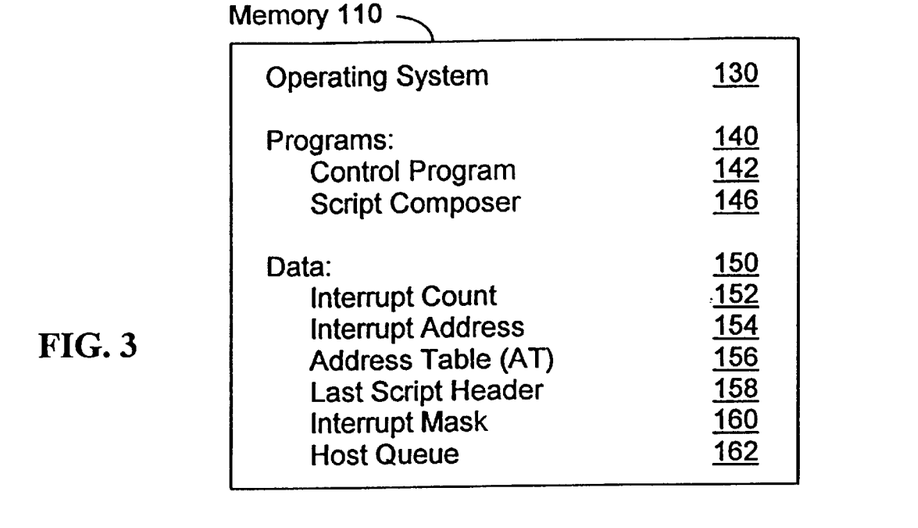
FIG. 3 is a block diagram of the memory 110 from FIG. 2 showing data structures defined therein in accordance with one embodiment of the present invention.

FIG. 3 is a block diagram of the memory 110 from FIG. 2 showing data structures and executables employed by one embodiment of the present invention. The memory 110 represents any combination of a fast semiconductor memory or a slower magnetic or optical memory. In the conventional manner, programs are stored in non-volatile magnetic memory 110 and then executed in semiconductor memory 110. The memory 10 includes an operating system 130, programs 140 and data 150.

The CPU 108 executes programs 140 under control of the operating system 130. The programs 140 include a control program 142 that, among other things, determines how the CPU 108 responds to interrupt requests 113c from the XOR engine 116. Another program 140 is the script composer 146, which generates the NorthBay scripts 109 based on requests/data 91 from the host 90. The data 150 includes, among other items, an interrupt count 152, an interrupt address 154, an address table (AT) 156, a last script header 158, an interrupt mask 160 and a queue(s) 162 for requests/data 91 from the host 90.

The interrupt count (int_cnt) 152 represents the number of interrupt requests 113c issued by the NorthBay 112 since some past event known to the CPU 108. This event can simply be the last time the CPU 108 serviced the NorthBay 112, in which case the CPU 108 simply sets the int_cnt 152 equal to the latest value of the NB interrupt count (NB_cnt) 113a. Alternatively, the event can be the last time the int_cnt 152 was reset by the CPU 108, in which case the CPU sets the int_cnt 152 equal to the sum of the NB_cnt 113a values received since that event. The interrupt address (int_addr) 154 stores the NB address (NB_addr) 113b read from the dipstick register 122 whenever that register is read by the CPU 108. In one embodiment the dipstick register 122 is completely rewritten after each NB interrupt request 113c, meaning that the int_addr 154 represents only the source of the latest interrupt request.

The address table 156 is an ordered list of all of the tasks 85 sent by the CPU 108 to the NorthBay 112 for execution since some past event known to the CPU 108. From this table 156, given an interrupt count 152 or an interrupt address 154, the CPU 108 can determine the tasks 85 that have been executed by the NorthBay 112 and therefore how many tasks 85 and/or scripts 109 remain to be executed by the NorthBay 112. When the NorthBay 112 is in need of more data to process the script composer 146 generates additional scripts 109 reflecting the queued host requests 162. One embodiment of the address table 156 is described below with reference to FIG. 6.

The last script header 158 is a local copy of the contents of a last-script-header-register (not shown) provided by the NorthBay 112. Generally, when a new script is processed, the script starting-point is saved into the last-script-header-register. It is the responsibility of the CPU 108 to save in the last script header variable 158 the address in the last-script-header-register 232, which the CPU 108 must then not reread.

The interrupt mask 160 is a set of bits that is ANDed with each interrupt request 113c from the NorthBay 112. When set to all zeroes the interrupt mask 160 completely blocks all interrupts. The interrupt mask 160 can also be configured to allow the CPU 108 to receive notification of an interrupt request while masking off information pertaining to the particular interrupt address. Interrupt masking is permissible and even desirable in embodiments of the present invention, whose central tenet is that the CPU 108 does not respond to individual interrupts. The queue(s) 162 hold requests/data 91 from the host 90 from which the CPU 108 formulates the scripts 109 issued to the NorthBay. Data structures defined in the NB-memory 124, which supports operation of the XOR engine 116, are now described with reference to FIG. 4A.

Figure 4A:
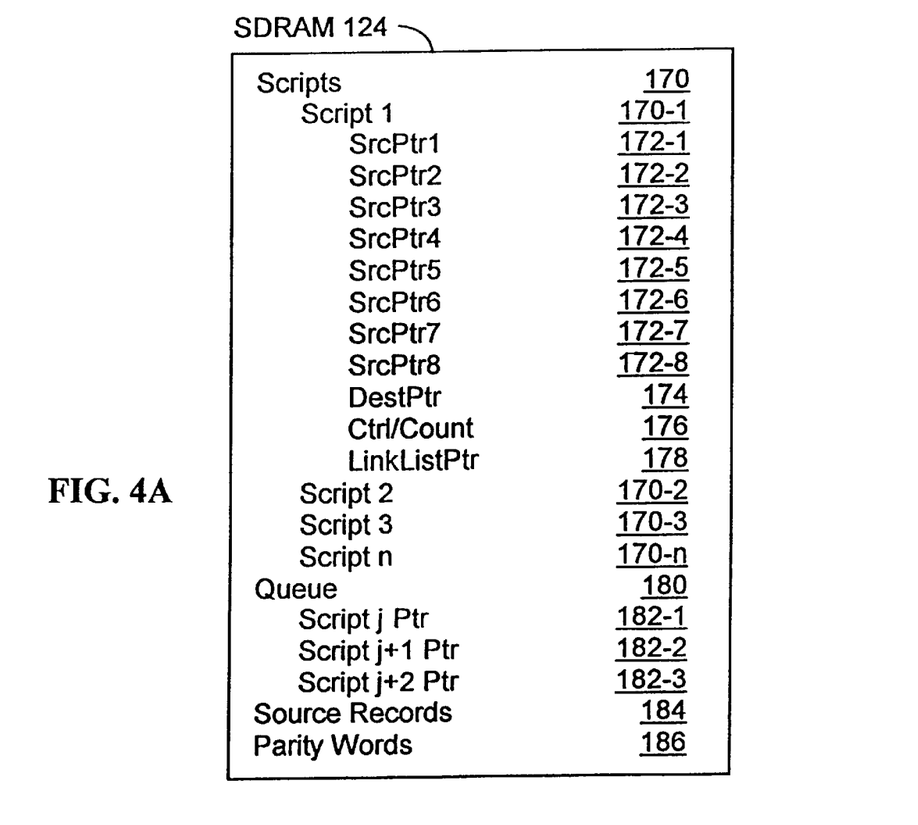
FIG. 4A is a block diagram of the NB-memory 124 from FIG. 2 showing data structure defined therein in accordance with one embodiment of the present invention.

FIG. 4A is a block diagram of the NB-memory 124 from FIG. 2 showing data structure defined therein in accordance with one embodiment of the present invention. The NB-memory 124 includes scripts 170, a queue 180, source records 184 and parity words 186. The scripts 170 are stored versions of the scripts 109 sent to the NorthBay 112 by the CPU 108. Each script 170 includes multiple source pointers 172 (in the illustrated embodiment, there are eight source pointers 172), each of which holds the address of a source record 184 stored in the NB-memory 124 for which the XOR engine 116 is to compute parity. Each source record 184 is copied to the NB-memory 124 from the disk array 106 by a process that is not described herein and that is not material to the present invention. A script 170 also includes a destination pointer 174, a control/count word 176 and a link list pointer 178. The destination pointer 174 holds the address of a NB-memory location in which the XOR engine 116 is to write the parity word 186 generated from the designated source records 184. In one embodiment the source and destination pointers 172, 174 designate a starting memory address of the data block 184 to be processed.

The control/count word 176 contains 8 control bits and a 24-bit transfer count indicating the size (e.g,. in bytes) of the record 184 designated by the source pointers 172. A 24-bit count can be used to transfer up to 16 Mbytes of data per each individual script operation. Among other things, the 8-control bits include a SCRIPT_STOP bit 186 (FIG. 4B) that indicates whether, after completing the present script 170, the XOR engine 116 is to continue processing another script 170 designated in the present script's link list address 178. The queue 180 includes a number of pointers 182 to scripts 170 received from the CPU 108, which remain to be processed.

In alternative embodiments, all or part of the memory queue 180 can be replaced with a script pointer FIFO queue implemented in hardware that can be directly accessed by the CPU. Such an alternative embodiment is shown in FIG. 4C, which is a block diagram of a hardware FIFO implemented in the NorthBay 112. When a FIFO is provided, the CPU 108 can simply push a script pointer 111i (FIG. 2) associated with a script 109i onto the top of the FIFO - the script 109i (stored as the script 170i) is executed by the XOR engine 116 as the script pointer 111i moves to the bottom of the FIFO.

Any number of chain operations may be programmed between the first and last scripts 170 in a chain (i.e., a chain can be as short as two chains and as long as a million claims or more ). In fact, the size of a script chain is only limited by the size of the NB-memory 124. During a chain operation the XOR engine 116 can compute a parity word 186 from all or a subset of the source records 184 designated by the chain of scripts 170. Each chain has its own source and destination addresses 172, 174, which respectively point to the source records 184 and the parity word 186 associated with the chain. An example of a script chain is now described with reference to FIG. 4B.

Figure 4B:
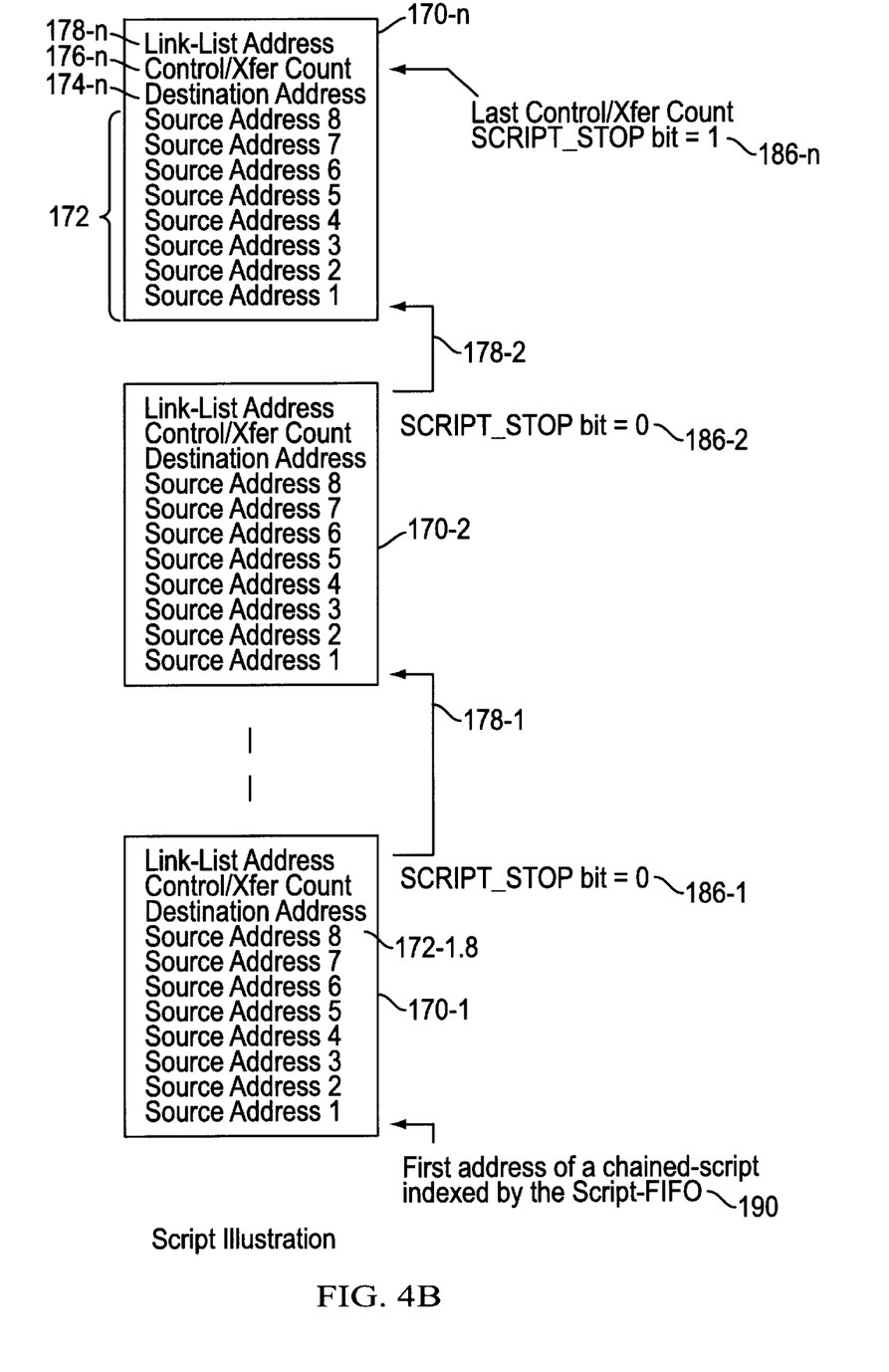
FIG. 4B is a block diagram illustrating organization of linked script data structures 170 in the NB-memory 124.
Figure 4C:
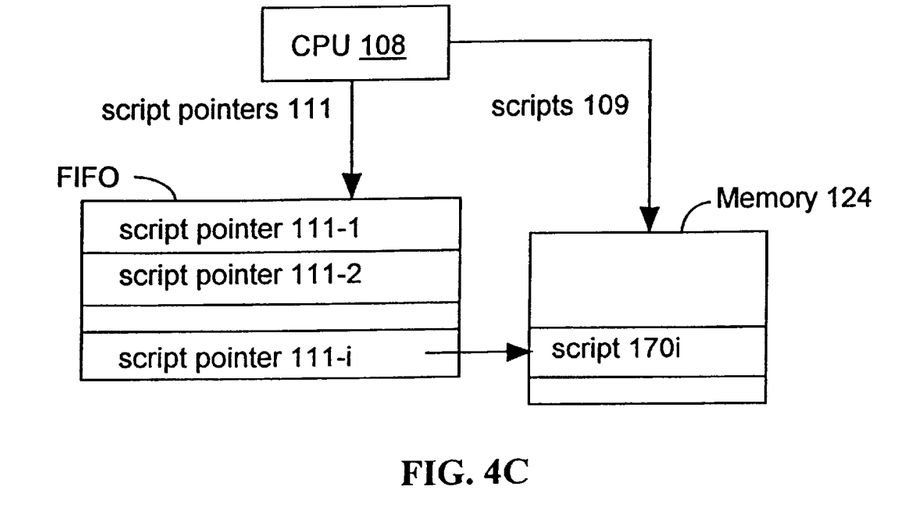
FIG. 4C is a block diagram of a hardware FIFO implemented in the NorthBay 112 to hold script pointers 111 written to the NorthBay 112 by the CPU 108.

FIG. 4B shows how scripts 170 can be chained using the aforementioned links 178 and control information 176. In this example the first of the chained scripts 170-1 is designated by a respective script pointer 182-1 or the bottom entry of a script pointer FIFO 190. The SCRIPT_STOP bit 186-1 of this script 170-1 is set to logical "0", which tells the XOR engine 116 that, after processing the source record designated by source address 8 (172-1.8) to continue processing the script 170-2 designated by the link 178-1. The script 170-2 is linked to the script 170-n in a similar manner. The XOR engine 116 finishes processing the script chain when it encounters in the script 170-n a SCRIPT_STOP bit 186-n set to logical "1".

Advantages of using script chains include reducing the complexity of XOR engine operation 116 and simplifying the memory allocation effort. For example, using the LinkListPtrs 178 to build a script chain frees the XOR engine 116 from the need to allocate all related scripts in a linear memory space. Instead, scripts can be scattered around. Moreover, because scripts can be scattered around, a single script or one chain of a script chain can be stored in very few words (e.g., eleven words, assuming a script 170 formatted as shown in FIGS. 4A and 4B). A method by which the CPU 108 and the NorthBay ASIC cooperatively compute parity using the interrupt handing mechanisms of the present invention is now described in reference to FIG. 5.

Figure 5:
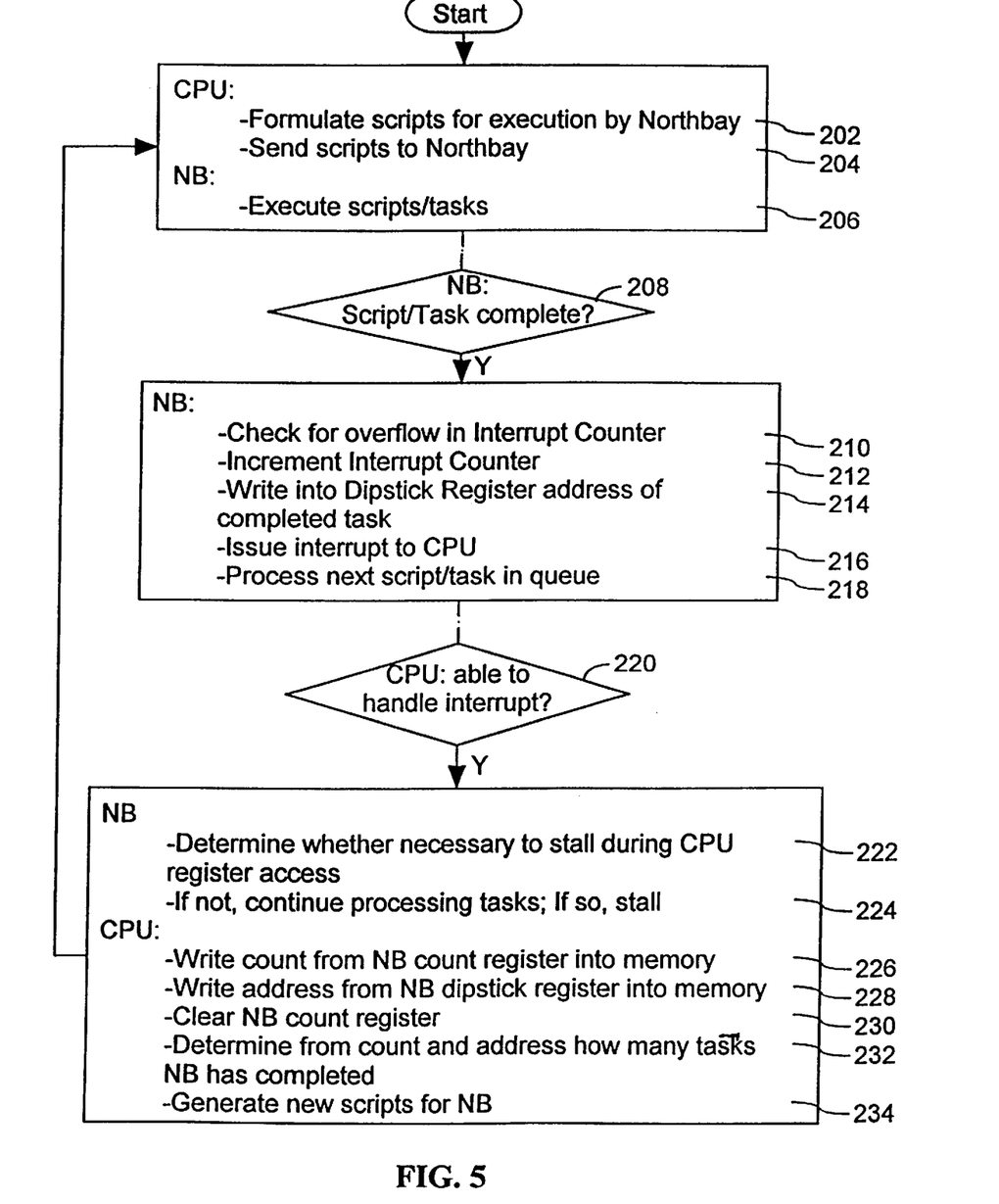
FIG. 5 is a flow diagram of interrupt handling operations performed by the CPU 108 and the NorthBay ASIC 112 of FIG. 2 in accordance with the present invention.

FIG. 5 shows a flow diagram of interrupt handling operations performed by the CPU 90 and the NorthBay (NB) ASIC 112 of FIG. 2 in accordance with the present invention. The order of operations shown in this diagram is merely exemplary; other arrangements of the operations are also possible and some steps can be omitted. Many of these operations have already been described above, so they are summarized herein only briefly. Generally, the operations attributed to the CPU 108 are carried out by the control program 142 and the operations attributed to the NorthBay 112 are carried out by firmware that controls operation of the XOR engine 116.

The XOR engine 116 is programmed for operation by the CPU control program 142, which writes a script (or script chain) 109 generated by the script composer 146 (step 202) into a pre-determined script area 170 of the NB-memory 124 as already described (204). The control program 142 then writes an associated script-pointer 111 to the queue 180 of stored script pointers 182 (FIGS. 4A, 4B) or, in alternative embodiments, to the hardware FIFO queue.

In one embodiment, the XOR engine 116 continually scans the queue 180 (or FIFO) for new script pointers 182. When a new script is a single script, the XOR engine 116 fetches the eleven data words 172, 174, 176, 178 composing the script 170 designated by the script pointer 182, computes the parity 186 of the source records 184 designated by the source pointers 172, and stores the parity 186 at the location designated by the destination pointer 174 (206). Note that as many as seven of the script pointers 172 may contain a null value, telling the XOR engine 116 that there is no associated source record 184 to retrieve. When a new script is a chain script, the XOR engine 116 executes all scripts 170 in the chain (206) and stores the resulting parity word(s) 186 at the location(s) designated by the destination pointer(s) 174.

Depending on its configuration, once the XOR engine 116 has completed a task, single script, or script chain (208-Y), the NorthBay 112 issues an interrupt request 113c to the CPU 108 (216). The CPU 108 is free to ignore or respond to this interrupt. Whenever it issues an interrupt request 113c the NorthBay 112 increments the interrupt counter register 120 by one to indicate that a new interrupt has just occurred (212). (The register 120 is first tested for the overflow condition (210) and the NorthBay stalled if such an overflow has occurred). The interrupt counter 120 continues to accumulate until the CPU control program 142 reads the interrupt counter register 120, at which point the interrupt counter 120 is reset to zero. The NorthBay 112 also stores into the dipstick register 122 the address of the task, script or script chain whose completion resulted in the generation of the interrupt 113c (214). The dipstick register 122 is a one-deep buffer, which is updated on each occurrence of a new interrupt 113c. Unlike the interrupt counter register 120, the dipstick register 122 is not cleared after it is read.

At this point the NorthBay proceeds to execute another script 170 (218) and the CPU 108 may or may not respond to the interrupt 113c (220). If it is able to handle the interrupt 113c or independently decides to service the NorthBay (220-Y) the CPU 108 initiates an interrupt handling operation.

As the first step in the interrupt handling operation the CPU 108 reads the interrupt counter 120 and the dipstick register 122 and uses the values 113a, 113b stored therein to update its internal interrupt count and address 152, 154 (FIG. 3) (226, 228). In particular, the CPU 108 must perform a back-to-back read where it reads the interrupt counter 120 first and then immediately thereafter reads the dipstick register 122. The CPU 108 clears the interrupt counter 120 after the reading step (230). Once it has updated its internal count and address 152, 154 the CPU 108 determines how many tasks the NorthBay 112 has executed since the last time the CPU checked the NorthBay interrupt status (232). The CPU 108 is able to make this determination because it generates the scripts 109 and controls the order of script 109 execution by the NorthBay 112. Additional details regarding how the CPU 108 makes this determination is described with reference to FIG. 6. Based on the numbers of pending scripts/tasks in the NorthBay 112 and pending host requests/data 91 in the host queue 162 the CPU uses its script generator 146 to generate new scripts for execution by the XOR engine 116 (234). For example, if the XOR engine 116 is about to run out of work, the CPU 108 will need to generate and send more scripts 109.

While the CPU 108 is accessing the interrupt counter 120 and the dipstick register 122 the NorthBay 112 determines whether it needs to stall or can continue executing scripts (222). In one embodiment the NorthBay 112 will stall if it is about to trigger issue another interrupt request 113c (224). If no interrupt request 113c is pending the NorthBay 112 will continue processing scripts 109 while the CPU 108 accesses the registers 120, 122. Given the speed of register access by the CPU 108, the stall situation is likely to occur infrequently. In fact, tests of an embodiment show that, under normal operating conditions, the NorthBay 112 stalls for this reason only about one percent of the time. Additional details are now provided regarding execution by the CPU 108 of the position determining step (232).

Generally, the CPU 108 can make the determination (232) according to at least one of three methods. According to a first method, the CPU 108 retrieves from an ordered list of tasks sent to the NorthBay 112 (e.g., the address table 156) a task or script address ADDRi whose location i in the list corresponds to a known function of a current count representing tasks executed by the NorthBay 112 since a known event (e.g., the interrupt count 152) and the NB interrupt count 113a. (The known event might be the last the CPU reset the interrupt count 152). The CPU 108 then verifies that the retrieved task address ADDRi and the current interrupt address NB_int 113b are identical. If they are not identical, then the CPU 108 can resolve the address/count mismatch using other control procedures 142.

In another method the CPU 108 searches in the ordered list (e.g., the address table 156) for the current interrupt address 113b and verifies the current interrupt count 113a by comparing it to a known function of the current count representing tasks executed by the NorthBay 112 since a known event (i.e., the interrupt count 152) and the index in the ordered list of the current address 113b.

The prior two methods allow for cross-verification of NB counts 113a and addresses 113b by using both values 113a, 113b to reference the address table 156. In some situations, one of the NB values 113a, 113b might not be available, or there might be no need to perform verification. In such a situation, yet another method allows the CPU 108 to determine the execution status of the NorthBay 112 using just one of the NB count 113a or address 113b. In this embodiment, when the interrupt generator (i.e., the NorthBay 112) provides only the interrupt count 113a, the CPU 108 determines from the current count 152 and the interrupt count 113a what previously queued tasks have been executed by the interrupt generator. Alternatively, when the interrupt generator (i.e. the NorthBay 112) provides only the interrupt address 113b, the CPU 108 determines from the position of the interrupt address 113b in the ordered list (e.g., the address table 156) what previously queued tasks have been executed by the interrupt generator. The first method is now described with reference to FIG. 6.

Figure 6:
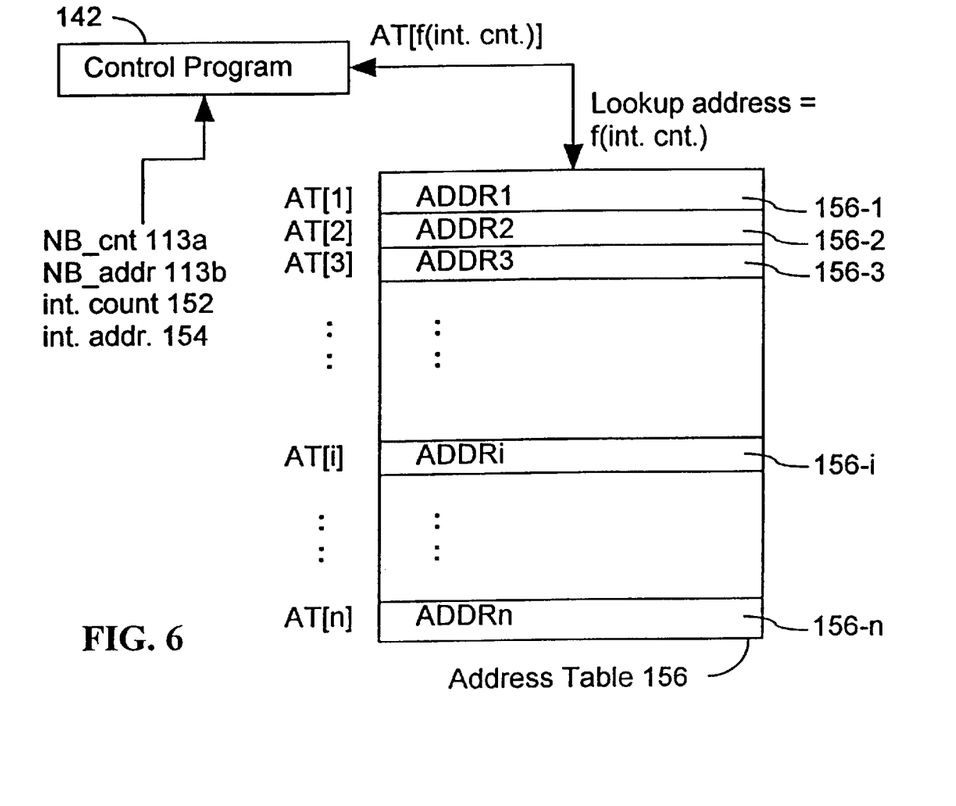
FIG. 6 is a block diagram illustrating a method by which the CPU 108 determines from the NB_cnt and NB_addr values which tasks have been completed by the NorthBay ASIC.

FIG. 6 shows one embodiment of the address table 156 including the addresses ADDR of the tasks 85 or scripts 109, stored in order. This example presumes that the CPU 108 starts writing the task 85 or script 109 addresses ADDR at the base table address (AT[1]) every time the NB_cnt 113a is reset to zero (i.e., the interrupt count 152 and the NB_cnt 113a are identical). In other embodiments the CPU 108 could accumulate the NB_cnt into the interrupt count 152, which would, as a result, be able to serve as a direct index into a large table 156. In the illustrated embodiment, the table index i of the task or script address ADDR associated with an interrupt address 113b can be determined with certainty by the CPU control program 142 based on some function of the current value of the interrupt count 152 (represented in FIG. 8 as "Lookup address=f(int. cnt.)"). For example, the CPU control program 142 could determine the relative position of a completed task 85 or script 109 associated with an NB_cnt 113a and NB_addr 133b returned by the NorthBay using the following steps:

(1) set interrupt_count 152=NB_cnt 113a;
(2) set interrupt_address 154=NB addr 113b;
(3) read AT[interrupt_count];
(4) verify that AT[interrupt_count]=interrupt_address;
(5) if step (4) is true, then the last task 85 completed by the NorthBay 112 is number NB_cnt out of the total number of tasks sent to the NorthBay 112 since the CPU 108 last reset the interrupt_count 152 and the NorthBay 112 reset the interrupt counter register 120;
(6) if step (4) is not true, then there is a mismatch to be resolved between the NB_addr 113b and the NB_cnt 113a.

In summary, embodiments of the present invention provide high throughput without imposing the stringent operating requirements regarding interrupt latency associated with realtime systems. A key advantage of the present invention is that it allows high throughput to be achieved without requiring a powerful CPU 108 to service interrupts generated by a very powerful coprocessor, such as the NorthBay 112. This arrangement can be implemented in any system wherein a powerful co-processor needs to work on data received from a potentially overburdened master processor and wherein minimal interrupt latency is not a requirement.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An interrupt handling mechanism for use with a computer-based system in which an interrupt generator issues interrupt requests that are serviced by an interrupt handler, comprising:

a group of ordered operations sent by the interrupt handler to the interrupt generator for execution;

the interrupt generator being configured to execute the ordered operations and issue an interrupt request following execution of a predetermined number of the ordered operations, the predetermined number ranging from one to all of the operations;

an interrupt tabulator including at least one of:
an interrupt counter that stores an interrupt count that is incremented by the interrupt handler each time the interrupt request is issued; and
an interrupt address register in which the interrupt generator writes an interrupt address associated with a respective operation whose execution caused the interrupt request to be issued; wherein the interrupt handler is configured, whenever the interrupt handler services the interrupt generator, not necessarily in response to the interrupt request, to read the interrupt tabulator to determine processing status of interrupt generator, including:
when the interrupt tabulator incorporates the interrupt counter, reading the interrupt count;
when the interrupt tabulator incorporates the interrupt address register, reading the interrupt address; and based on the processing status of the interrupt generator, the interrupt handler is configured to determine which of the ordered operations are still pending for execution by the interrupt generator and to, as a result, send an additional group of ordered operations to the interrupt generator in order to keep the interrupt generator as busy as possible.

2. The interrupt handling mechanism of claim 1, wherein when the interrupt tabulator incorporates the interrupt counter, the interrupt handler is configured to reset the interrupt count after reading the interrupt count.

3. The interrupt handling mechanism of claim 1, wherein the interrupt generator is able to issue the interrupt requests at a rate that is greater than the interrupt requests can be individually serviced by the interrupt handler.

4. The interrupt handling mechanism of claim 1, wherein the interrupt handler is optimized to provide high system throughput without attempting to provide minimal interrupt latency in handling the interrupt requests.

5. The interrupt handling mechanism of claim 1, wherein the interrupt handler includes an ordered list of the ordered operations, the interrupt handler being configured to determine which of the ordered operations are still pending for execution by the interrupt generator by comparing any combination of the interrupt count and the interrupt address to contents of the ordered list.

6. The interrupt handling mechanism of claim 1, wherein the computer-based system is a RAID system and the ordered operations comprise scripts designating parity calculations to be performed by the interrupt handler on RAID data.

7. An interrupt handling mechanism for use in a computer-based system in which an interrupt generator issues interrupt requests that are serviced by an interrupt handler following execution of operations issued to the interrupt generator by the interrupt handler in response to requests from a host system, comprising:

address storage in which the interrupt handler keeps an ordered list of the operations issued to the interrupt generator;

interrupt status storage in which the interrupt generator keeps interrupt data indicating which of the operations was most recently executed to completion, causing the interrupt generator to generate a respective interrupt request;

the interrupt handler being free to ignore the interrupt request and instead provide interrupt services to the interrupt handler so as to ensure optimal data throughput in the computer-based system;

the interrupt handler, when it provides the interrupt services, being configured to read the interrupt data and to determine from comparison of the interrupt data to contents of the address storage a processing status characterizing which of the operations previously sent by the interrupt handler to the interrupt generator are pending; and the interrupt handler, based on the processing status and the requests from the host system, sending an additional group of ordered operations to the interrupt generator in order to keep the interrupt generator as busy as possible.

* * * * *